United States Patent

Gambetta et al.

[11] Patent Number: 5,979,874
[45] Date of Patent: Nov. 9, 1999

[54] SPLIT KNIFE GATE VALVE HAVING A UNIFORMLY COMPRESSED AND CONSTRAINED RESILIENT GATE SEAT AND METHOD FOR PRODUCING THE SAME

[75] Inventors: David L. Gambetta; Darrel J. DesRochers, both of Vancouver, Wash.

[73] Assignee: Technaflow, Inc., Vancouver, Wash.

[21] Appl. No.: 08/967,686

[22] Filed: Nov. 10, 1997

Related U.S. Application Data

[63] Continuation of application No. 08/800,816, Feb. 18, 1997, abandoned.

[51] Int. Cl.$^6$ ........................................................ F16K 3/02
[52] U.S. Cl. ............................................. 251/328; 251/327
[58] Field of Search ..................................... 251/327, 328; 137/315

[56] References Cited

U.S. PATENT DOCUMENTS

| | | | |
|---|---|---|---|
| 4,377,274 | 3/1983 | Mayhew, Jr. ........................... | 251/327 |
| 4,881,719 | 11/1989 | Bowman .................................. | 251/328 |
| 5,141,361 | 8/1992 | Fontaine .................................. | 251/328 |
| 5,197,512 | 5/1993 | Lev ..................................... | 251/327 X |
| 5,205,317 | 4/1993 | Neuerberg et al. ..................... | 251/327 |
| 5,330,158 | 7/1994 | Ellich et al. ............................ | 251/327 |

OTHER PUBLICATIONS

Lined Valve Company, Inc. Brochure for Figure 53 Ductile Iron Knife Gate Valve, Jun. 1995.
Set of Five Photographs of a Split Body Knife Gate Valve and its Components.

*Primary Examiner*—John Fox
*Attorney, Agent, or Firm*—Stoel Rives LLP

[57] ABSTRACT

A knife gate valve is constructed of two body members bolted together about a resilient gate seat. The two body members and the resilient gate seat include sets of axially aligned bolt holes through which machine bolts extend. Matching flanges on the body members form a recess for receiving the resilient gate seat, thereby constraining its movement and preventing its deformation when the knife gate is closed. The matching flanges also facilitate the uniform tightening of the machine bolts during gate valve assembly.

9 Claims, 2 Drawing Sheets

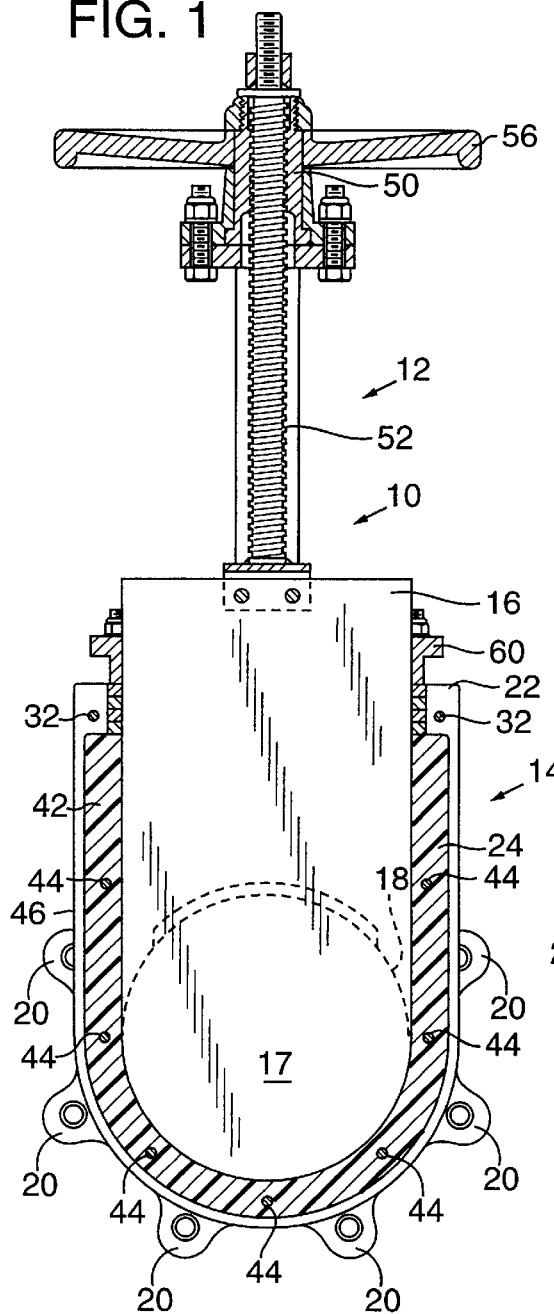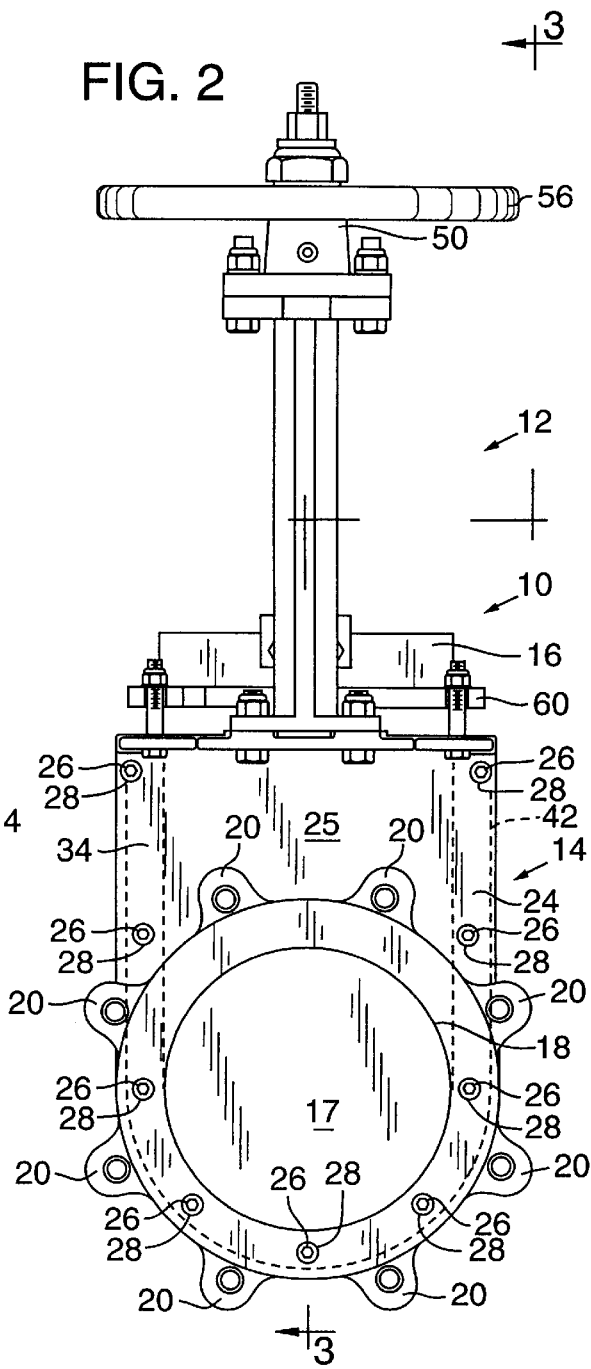

FIG. 3
FIG. 4
FIG. 5
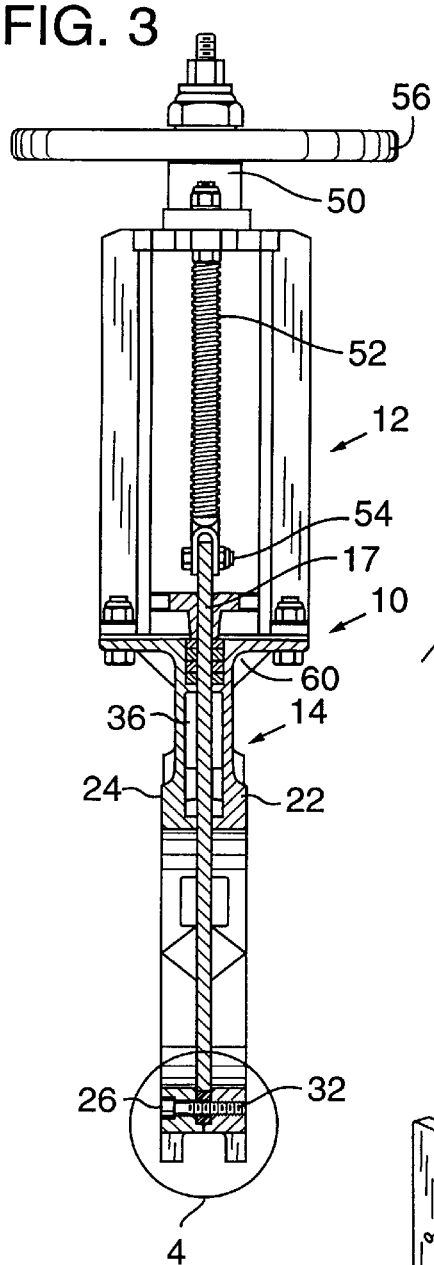
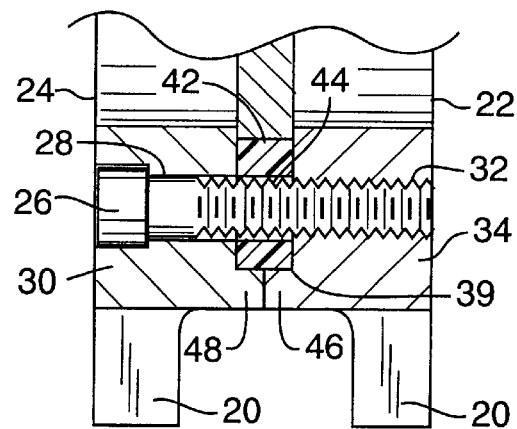
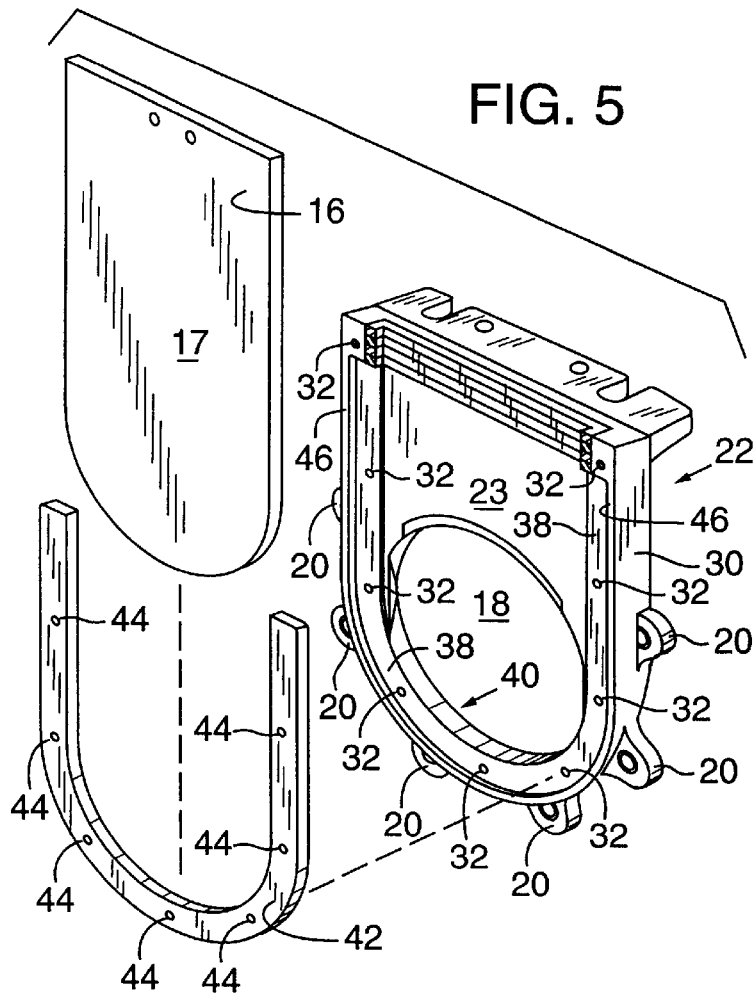

SPLIT KNIFE GATE VALVE HAVING A UNIFORMLY COMPRESSED AND CONSTRAINED RESILIENT GATE SEAT AND METHOD FOR PRODUCING THE SAME

RELATED PATENT APPLICATION

This is a continuation of application Ser. No. 08/800,816, filed Feb. 18, 1997, now abandoned.

TECHNICAL FIELD

The present invention relates to knife gate valves.

BACKGROUND OF THE INVENTION

Knife gate valves have traditionally been used to control the flow of heavy slurries transported through tubular conduits. The knife gate has a blade portion with a beveled edge to cut through the material suspended in the slurry as the knife gate is lowered to seal off the flow through the valve. The knife gate typically closes against the metal valve body, and the slurry assists in sealing the valve.

A problem associated with using a knife gate to control the flow of slurries of light viscosities is that the material accumulating on the surface of the valve seat prevents a tight seal. Therefore, knife gate valves controlling the flow of light viscosity slurries typically employ a resilient gate seat liner that is squeezed between the knife gate and the metal valve body when the valve is in the closed position.

When an adhesive slurry (e.g., paper pulp) is being handled, however, the slurry material that accumulates on the gate seat liner tends to cause the Wife gate to adhere to and pull out the seat liner when the knife gate is retracted to open the valve. The flowing slurry may then carry the seat liner downstream in the conduit system. Although lubricating the gate-contacting surface of the valve seat liner can reduce surface friction and thereby prevent adhesion of the knife gate to the seat, the lubricating fluid may be quickly carried away by moving slurry.

To avoid this problem, a valve has been introduced that comprises two, essentially flat, valve body members bolted together about a resilient gate seat. Each bolt runs through a bolt hole in the resilient gate seat to positively retain it. Two principal problems occur with this design. The first problem arises during operation. The essentially flat valve body members do not constrain the sealing member in the radial dimension (defined relative to the center of the flow opening). As a result, when the valve is closed, the knife gate pushes the resilient gate seat radially outwardly. Although the fasteners running through the sealing member constrain this radial movement, enough deformation is possible between each pair of fasteners that the effectiveness of the seal is reduced.

The second problem arises during manufacturing. If one bolt is fastened more tightly than another, the gate seat will be compressed more in one spot than in another. This reduces the effectiveness of the seal. It is even possible that pressurized slurry could leak around one or more loosely tightened fasteners. Tightening all the bolts equally, which is necessary to ensure a good seal, increases the expense and complicates the manufacturing process.

SUMMARY OF THE INVENTION

An object of this invention is to provide a knife gate valve having a positively retained resilient gate seat that is physically constrained to prevent deformation and that thereby produces a better seal.

An advantage of the present invention is that it provides a knife gate valve that is easily assembled.

The knife gate valve of the present invention comprises a set of fasteners, wherein each fastener extends through a first body member, a U-shaped resilient gate seat, and a second body member to form a valve body that is attachable between two conduits to define a connecting flow passageway. The resilient gate seat is positively retained by the set of fasteners.

The first body member has a flange around its rim such that when the two body members are bolted together, the flange contacts the rim of the second body member, thereby defining a seat-retaining recess having a predetermined width. The gate seat, fastened into place between the body members, is uniformly compressed to the predetermined width.

The present invention also comprises a method of assembling the above-described knife gate valve by tightening each fastener until the flange of the first body member meets the rim of the second body member. The metal-to-metal contact provides a hard stop to screw rotation, thereby easing the manufacturing process.

Additional objects and advantages of this invention will be apparent from the following detailed description of a preferred embodiment thereof, which proceeds with reference to the accompanying drawings.

BRIEF DESCRIPTION OF THE DRAWINGS

FIG. 1 is a front elevation view of the knife gate valve of the present invention that is shown partly in cross section with the knife gate in the closed position;

FIG. 2 is a front elevation view of the knife gate valve of FIG. 1 that is shown with the knife gate in the closed position;

FIG. 3 is a sectional view taken along lines 3—3 of FIG. 2;

FIG. 4 is an enlarged detail cross-sectional view of the portion of FIG. 3 that is included within circle 4; and FIG. 5 is an exploded isometric view of the resilient gate seat and associated parts of the kife gate valve of FIG. 1.

DETAILED DESCRIPTION OF A PREFERRED EMBODIMENT

FIGS. 1–5 show a knife gate valve 10 that is comprised of a gate actuator assembly 12 and a valve body assembly 14. Gate actuator assembly 12 moves a knife gate 16, which includes a blade portion 17, so that blade portion 17 either occludes or does not occlude a flow opening 18. A set of apertured flanges 20 permits the attachment of a pair of conduits (not shown) to knife gate valve 10 in alignient with flow opening 18.

Valve body assembly 14 is comprised of a first body member 22 having an inner side 23 and an opposed outer side (not shown) and a second body member 24 having an outer side 25 and an opposed inner side (not shown). Body members 22 and 24 are fastened together by bolts 26 passing through second body member unthreaded bolt holes 28, which are located in a second body member rim 30, and first body member threaded bolt holes 32, which are located in a first body member rim 34. In as alternative embodiment, first and second body members 22 and 24 are identical with threaded and unthreaded bolt holes interspersed so that when inner side 23 of first body member 22 is faced to the inner side (not shown) of second body member 24, each threaded bolt hole lines up with an unthreaded bolt hole. Skilled persons will recognize that other types of fasteners such as studs or pins, and combinations thereof, can be used.

The bolted-together body members define a gate receiving space 36. A first body member recess 38 combines with its mirror image (not shown) in second body member 24 to form a gate seat receiving recess 39 (FIG. 4). In this configuration, the term "inwardly" refers to the direction toward the plane at which body member 22 meets body member 24.

A flow axis 40 (FIG. 5) defines the axial dimension. The radial dimension emanates outwardly from axis 40. A U-shaped resilient gate seat 42 occupies gate seat receiving recess 39 and includes multiple gate seat bolt holes 44 spaced apart along its U-shaped profile. When body members 22 and 24 are fastened together, bolts 26 extend through resilient gate seat bolt holes 44 to positively retain resilient gate seat 42. Rim 34 and rim 30 terminate in inwardly directed flanges 46 and 48, respectively. When bolts 26 are secured in place, flange 46 abuts flange 48 to thereby define gate receiving space 36 (FIG. 3) and gate seat receiving recess 39 (FIG. 4).

When they are in solid contact, flanges 46 and 48 ensure that the width of gate seat receiving recess 39 is uniform, resilient gate seat 42 is uniformly compressed to an optimal density, and the movement of resilient gate seat 42 is constrained. When valve 10 is in its closed position, blade portion 17 exerts pressure against resilient gate seat 42, potentially causing resilient gate seat 42 to deform away from blade portion 17. This deformation can cause leaks to develop through the seal between blade portion 17 and resilient gate seat 42. Flanges 46 and 48 form gate seat receiving recess 39, which constrains the deformation of resilient gate seat 42 to establish a more secure seal.

Valve body assembly 14 is produced by fitting resilient gate seat 42 in gate receiving recess 39 as body members 22 and 24 are mated. Body members 22 and 24 are secured together by bolts 26 extending through axially aligned body member bolt holes 28 and resilient gate seat bolt holes 44 and into bolt holes 32.

The assembly of prior art valves having two matable body members similar to body members 22 and 24 but without flanges 46 and 48 requires extra attention because it is difficult to uniformly tighten bolts that function similarly to bolts 26 to secure the body members together. When one of the bolts is tightened to a greater tension than another bolt, the resilient gate seat becomes unevenly compressed. This uneven compression can cause a less even seal between the knife gate and the resilient gate seat and permit leaks to develop between the resilient gate seat and the body members. With the assembly method of the present invention, bolts 26 are tightened until flange 46 firmly abuts flange 48, thereby preventing further tightening. Bolts 26 are easily tightened until a hard stop is reached caused by the uniform meeting of flange 46 and flange 48, and, consequently, resilient gate seat 42 is compressed uniformly.

With particular reference to FIGS. 1, 2, and 3, gate actuator assembly 12, which is a standard feature in gate valves and is familiar to skilled persons, is secured to the upper portion of body assembly 14. Assembly 12 supports a stem nut 50 through which a valve stem 52 is threaded. The lower end of valve stem 52 is secured to the upper end of knife gate 16 by a pair of bolt assemblies 54 (one shown in FIG. 3). The upper end of valve stem 52 passes through a threaded bore located in the center of a hand wheel 56.

Turning hand wheel 56 in one direction moves knife gate 16 downward, thereby inserting blade portion 17 into gate seat receiving recess 39 and into contact with resilient gate seat 42 to close valve 10. Likewise, turning hand wheel 56 in the opposite direction moves knife gate 16 upward, thereby retracting blade portion 17 from gate seat receiving recess 39 to open valve 10.

Those skilled in the art will recognize that other types of actuators are also possible. For instance, an electric motor or a pneumatic device could be used to move knife gate 16 between its open and closed positions. A packing gland 60 is a standard feature in gate valves and is of a design familiar to those skilled in the art.

It will be obvious to those having skill in the art that many changes may be made to the details of the above-described embodiment of this invention without departing from the underlying principles thereof. For example, flange 46 may be omitted and flange 48 may extended to contact rim 30, or vice versa. The scope of the present invention should, therefore, be determined only by the following claims.

We claim:

1. A knife gate valve for controlling fluid flow between two aligned conduits, comprising:

a first body member having an outer side to which a conduit is attachable and an inner side, the first body member having a first flow opening defining a fluid flow passageway and having a first rim that includes a first flange extending in a direction away from the inner side;

a second body member having an outer side to which a conduit is attachable and an inner side, the second body member having a second flow opening axially aligned with the first flow opening and having a second rim, the second body member contacting the first body member such that the second rim abuts the first flange to define a recess and a gate receiving space, the recess having a length;

a knife gate having a blade portion that fits within the gate receiving space;

a gate actuator for moving the blade portion of the knife gate along the length of the recess to occlude the fluid flow passageway;

a resilient gate seat positioned to conformably fit within the recess to form an interface between the knife gate and the first flange, the resilient gate seat having a profile and a length; and a set of fasteners spaced apart along the length of the gate seat to collectively fasten together the first body member, the gate seat, and the second body member so that the first flange and the second rim contact each other to cause the recess to hold the resilient gate seat at a predetermined uniform compression and the first flange to constrain movement of the gate seat and thereby provide a tight fluid seal.

2. The knife gate valve of claim 1, wherein the second rim further includes a second flange extending in a direction away from the inner side of the second body member, and wherein the first flange abuts the second flange.

3. The knife gate valve of claim 1, wherein the first and second rims include multiple axially aligned respective first and second fastener holes and the resilient gate seat includes multiple gate seat fastener holes, and wherein corresponding ones of the first, second, and gate seat fastener holes are in axial alignment and receive the fasteners to collectively fasten the gate seat between the first and second body members.

4. The knife gate valve of claim 1, wherein the resilient gate seat has a U-shaped profile.

5. A method of producing a knife gate valve for controlling fluid flow between two aligned conduits, comprising:

providing a first body member having a first outer side to which a conduit is attachable and a first inner side, the first body member having a first opening that defines a flow passageway between the conduits and having a first rim, the first rim including a first flange extending away from the first inner side and including multiple first spaced-apart fastener holes;

providing a second body member having a second outer side to which a conduit is attachable and a second inner side, the second body member having a second rim that includes multiple second spaced-apart fastener holes and a second opening that is axially aligned with the first opening;

providing a resilient gate seat that includes multiple third spaced-apart fastener holes; and fastening the first body member to the second body member about the resilient gate seat by receiving a fastener in each of corresponding axially aligned ones of the first, second, and third fastener holes and securing each fastener, the first flange and the second body member contacting each other and thereby forming a recess to hold the resilient gate seat at a predetermined uniform compression and constrain movement of the resilient gate seat to provide a tight fluid seal.

6. The method of claim 5, wherein each fastener comprises a bolt that is tightened until the flange contacts the second rim, thereby preventing further and possible nonuniform tightening.

7. The method of claim 5, wherein the first flange is dimensioned so when it uniformly contacts the second rim, the resilient gate seat is uniformly compressed to a substantially optimal density.

8. The method of claim 5, wherein the second rim includes a second flange extending away from the second inner side.

9. The method of claim 8, wherein each fastener is tightened until the first flange contacts the second flange.

* * * * *